(12) United States Patent
Stewart et al.

(10) Patent No.: US 10,056,756 B2
(45) Date of Patent: Aug. 21, 2018

(54) METHOD AND APPARATUS TO SOLVE PFC CAPACITOR REDUCTION OF LINE AFLC RIPPLE WITHOUT PASSIVE FILTERS

(71) Applicant: Edge Electrons Limited, Hong Kong (HK)

(72) Inventors: Neal George Stewart, Hong Kong (HK); Wing Ling Cheng, Hong Kong (HK)

(73) Assignee: EDGE ELECTRONS LIMITED, Hong Kong (HK)

( * ) Notice: Subject to any disclaimer, the term of this patent is extended or adjusted under 35 U.S.C. 154(b) by 0 days.

(21) Appl. No.: 15/555,079

(22) PCT Filed: Mar. 1, 2016

(86) PCT No.: PCT/CN2016/075144
§ 371 (c)(1),
(2) Date: Sep. 1, 2017

(87) PCT Pub. No.: WO2016/138847
PCT Pub. Date: Sep. 9, 2016

(65) Prior Publication Data
US 2018/0041034 A1  Feb. 8, 2018

Related U.S. Application Data

(60) Provisional application No. 62/126,706, filed on Mar. 1, 2015.

(51) Int. Cl.
*H02J 3/18*  (2006.01)
*H04B 3/54*  (2006.01)

(52) U.S. Cl.
CPC ............ *H02J 3/1828* (2013.01); *H04B 3/542* (2013.01); *H04B 3/546* (2013.01)

(58) Field of Classification Search
None
See application file for complete search history.

(56) References Cited

U.S. PATENT DOCUMENTS

2010/0001698 A1*  1/2010  Johnson ................ H02J 3/1864
                                                           323/209
2014/0103888 A1*  4/2014  Divan ........................ G05F 3/02
                                                           323/208

\* cited by examiner

*Primary Examiner* — Jeffrey Gblende
*Assistant Examiner* — David A. Singh
(74) *Attorney, Agent, or Firm* — Idea Intellectual Limited; Margaret A. Burke; Sam T. Yip (57) ABSTRACT

Audio Frequency Load Control (AFLC) signal processing electronics added to a power factor correction (PFC) unit allowing the AFLC system to operate without the need of large and heavy passive bypass or blocking filters at the PFC installations. The AFLC signal processing electronics a first group of additional electronics tuned to the AFLC frequency for detecting the AFLC carrier signal; and a second group of additional electronics for driving an AFLC impedance switch that is connected in parallel with an AFLC impedance. The AFLC impedance is connected in series with the PFC capacitors, and is sufficiently large to offer significant impedance in series with the PFC capacitors that allows the AFLC signal to bypass the PFC unit.

6 Claims, 6 Drawing Sheets

METHOD AND APPARATUS TO SOLVE PFC CAPACITOR REDUCTION OF LINE AFLC RIPPLE WITHOUT PASSIVE FILTERS

CROSS-REFERENCE TO RELATED APPLICATIONS

This application is a national phase entry of International Patent Application PCT/CN2016/075144 filed on Mar. 1, 2016 which claims priority to the U.S. Provisional Patent Application No. 62/126,706 filed on Mar. 1, 2015; the disclosures of which are incorporated herein by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to power electronics. Particularly, the present invention relates to methods and power electronics for achieving Audio Frequency Load Control (AFLC) in electrical power distribution network, and more particularly achieving AFLC without the needs of legacy passive filters to bypass or block AFLC signals in power factor correction (PFC) installations.

BACKGROUND

Since 1950's the electrical industry has been using Audio Frequency Load Control (AFLC) system for load balancing control in electrical power distribution networks. In general, a AFLC system works to inject electrical signals of fixed audio frequencies, e.g. 1,042 Hz or 1,050 Hz typically, at the high voltage distribution network equipment, which are then distributed to the low voltage networks and then further to the points of load where AFLC frequency sensitive relays (AFLC relays) responsive to the AFLC signals are installed. An AFLC relay is tuned to respond to a specific AFLC carrier or "ripple" frequency that is modulated with a digital data signal. The digital data signal carries instructions for the AFLC relay to turn a power sub-circuit on and off, as such load shedding heavy loads such as hot water heaters, ovens, air-conditioners, etc. This enables network operators to have point of use control of heavier electrical loads to balance the power generation and usage.

In more recent times, to optimize the operating conditions for maximum energy efficiency in the usage, transmission, and delivery of alternating current (AC) electrical power, network operators have been installing switched capacitor power factor correction (PFC) equipment in electrical power distribution networks. The PFC equipment basically comprises capacitors that are in shunt with the mains network and operate at the mains frequencies, e.g. 50 Hz and 60 Hz. The presence of the PFC capacitors, however, presents a very low impedance to the higher AFLC frequencies, e.g. a factor of over twenty impedance reduction in the cases of 1,042 Hz and 1,050 Hz. This in turn bypasses the high frequency AFLC signals to neutral and/or short-circuiting the AFLC signals, reducing the amplitude of the AFLC signals enough to cause unreliable operation of the AFLC relays and malfunction to the AFLC network load balancing scheme. To mitigate this problem, one well-established legacy solution is to install large and heavy passive bypass or blocking filters at the PFC installations. This solution, however, adds size, weight, and cost to the PFC installation.

SUMMARY

In general, a PFC unit comprises a number of PFC capacitors operating at the mains frequencies, e.g. 50 Hz or 60 Hz, combined with some means of switching on and off the electrical connections of the PFC capacitors to create combinations of capacitors in shunt across the mains. The combinations of capacitors provide the proximate capacitances to compensate the various degrees of phase shift between the mains load AC current and AC voltage, thus correcting the power factor to unity. A PFC unit usually comprises at least the control electronics to perform the following functions:
1. detecting the mains load AC voltage phase;
2. detecting the mains load AC current phase;
3. measuring the phase shift between the mains load voltage and current; and
4. based on the measured phase shift, determining and controlling the switching sequence of the PFC capacitor switches to arrive at the nearest PFC capacitance value to correct the phase shift.

In addressing the abovementioned shortcoming of the legacy solution of installing large and heavy passive bypass or blocking filters at PFC installations in mitigating the disruption to AFLC network load balancing caused by the presence of PFC equipment in the electrical power distribution network, the present invention provides the AFLC signal processing electronics that detect the AFLC "ripple" signals and rapidly, within a few milliseconds, either switches out the PFC capacitors hence allowing the AFLC signals to pass unimpeded, or introduce an impedance, such as a suitable resistor in series with the PFC capacitors, to create the unimpeded operation of the AFLC system. The electronics also, after a suitable time period, allow the PFC unit to return to normal operation once the AFLC signals have passed. This negates the need for the legacy large and heavy passive AFLC bypass or blocking filters.

Although the methods of rapidly removing the PFC capacitors, or introducing a simple impedance in series with the PFC capacitors maybe obvious to one ordinarily skilled in the art, it does not in any way negate the basis and novelty of the present invention of using electronics means to allow a AFLC system to operate normally with a PFC unit without using a large and heavy passive AFLC filter to bypass or block the AFLC signals.

The objective of the present invention is to rapidly, within a few milliseconds, introduce a simple suitable impedance connected in series with the PFC capacitors when the AFLC signal is present rather than the alternative of switching in and out all or most of the PFC capacitors. This minimizes the mains voltage and current disturbance during the series impedance switching

BRIEF DESCRIPTION OF THE DRAWINGS

Embodiments of the invention are described in more detail hereinafter with reference to the drawings, in which.

DETAILED DESCRIPTION

In the following description, methods, systems, and apparatuses for allowing AFLC network load balancing to work in the presence of PFC equipment in the electrical power distribution network and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
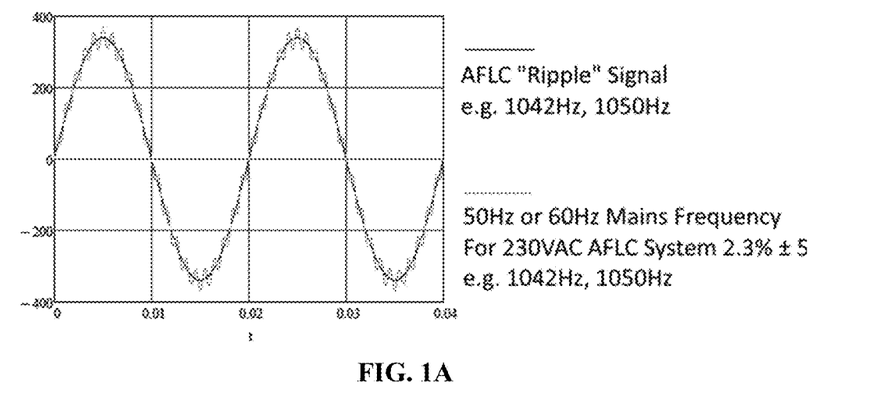
FIG. 1A shows the high audio frequency (e.g. 1,042 Hz, or 1,050 Hz) AFLC carrier or "ripple" signal impressed onto a 50 Hz or 60 Hz mains AC voltage.

FIG. 1A shows the high audio frequency (e.g. 1,042 Hz, or 1,050 Hz) AFLC carrier or "ripple" signal impressed onto a 50 Hz or 60 Hz mains AC voltage. For example, in Australia the standard AC mains voltage is provided at 230VAC and 50 Hz. The AFLC signals at the AFLC relays are provided at approximately 2-3% of that voltage. Typically an AFLC signal needs to be at approximately 5-6 Volt level in amplitude at the AFLC relays, which can then be demodulated and decoded for instructional data for controlling their load shedding operations.

Figure 1B:
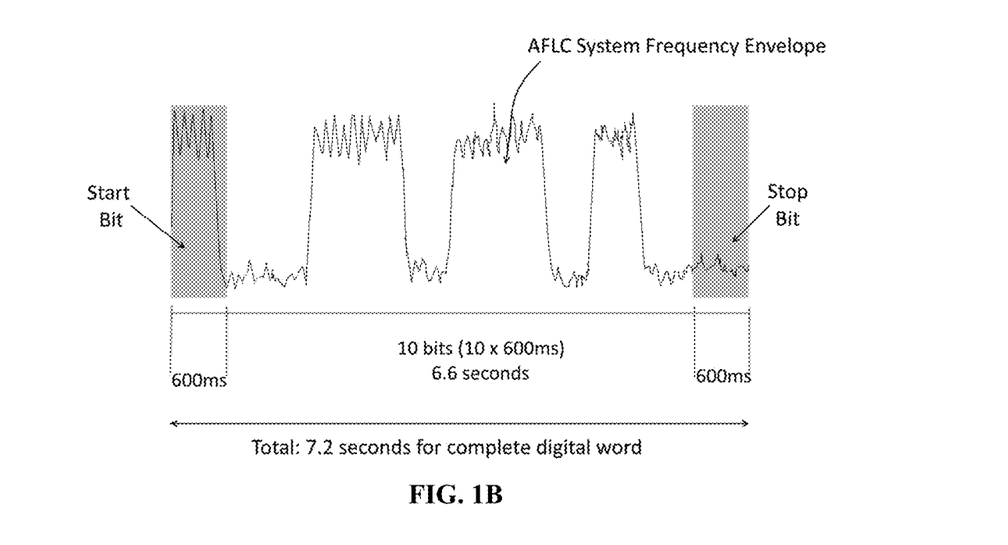
FIG. 1B shows details of the digital encoding of a legacy Decabit AFLC carrier or "ripple" signal encoded with a standard Decabit digital word.

FIG. 1B shows the details of the digital encoding of a legacy Decabit AFLC carrier or "ripple" signal encoded with a standard Decabit digital word. The AFLC relay responding to the AFLC carrier or "ripple" signal is instructed through the digital word to connect or disconnect specific electrical load in the facility where the AFLC relay is installed. It shall be apparent to an ordinarily skilled person in the art to apply the present invention to other AFLC frequencies and systems.

Figure 2:
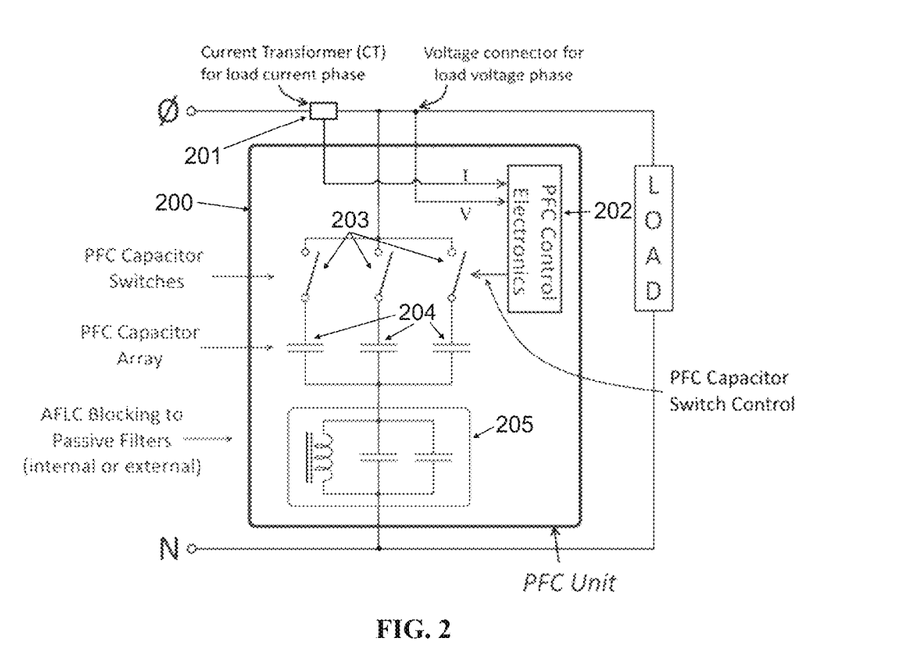
FIG. 2 depicts a simplified circuit diagram of a standard legacy switched capacitor PFC system that is installed at a typical facility that needs power factor correction.

FIG. 2 depicts a simplified circuit diagram of a standard legacy switched capacitor PFC unit 200 installed at a typical facility that needs power factor correction. The power factor correction is achieved by the PFC controller 202 through the current transformer (CT) 201 in measuring the mains load current waveform and through various means in measuring the mains load voltage waveform. The PFC controller 202 then measures the phase shift between the mains load voltage and current, and based on the measured phase shift, determines and controls the switching sequence of the PFC capacitor switches 203 to arrive at the nearest PFC capacitance value to correct the phase shift.

The large PFC capacitors 204 connected in shunt across the mains create a problem with the AFLC system. The presence of the PFC capacitors 204 presents very low impedance to the higher AFLC frequencies of e.g. 1,042 Hz and 1,050 Hz. This in turn bypasses the high frequency AFLC signals to neutral and/or short-circuiting the AFLC signals, reducing the amplitude of the AFLC signals enough to cause unreliable operation of the AFLC relays and malfunction to the AFLC network load balancing.

Still referring to FIG. 2. To mitigate this problem, one solution is to install the AFLC blocking passive filters 205 external or internal to the PFC unit 200. The AFLC blocking passive filters 205 are typically installed as a parallel circuit tuned to the specific AFLC frequency used in the particular electrical power distribution network mains. The AFLC blocking passive filters 205 present a low impedance at the mains frequency, e.g. 50 Hz or 60 Hz, but present a high impedance at the AFLC frequencies, e.g. 1,042 Hz or 1,050 Hz. In general, AFLC blocking passive filters are large, heavy, and can create harmonic resonances in the electrical systems. Moreover, AFLC blocking passive filters are typically much more complex than those as shown in FIG. 2 with additional filter elements, adding significant size, weight, and cost to the PFC equipment and/or installations.

Figure 3A:
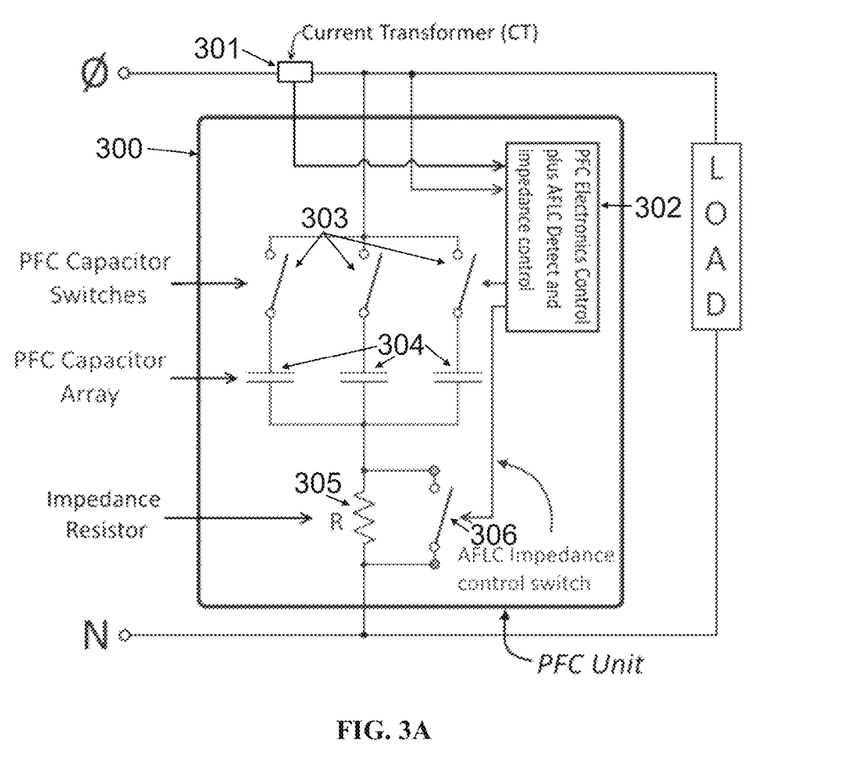
FIG. 3A depicts a simplified circuit diagram of a PFC unit with the AFLC signal processing electronics in accordance to an embodiment of the present invention.

FIG. 3A depicts a simplified circuit diagram of a PFC unit 300 with the AFLC signal processing electronics in accordance to an embodiment of the present invention. The AFLC signal processing electronics comprise electronic components added to the electronics already employed in the PFC unit 300. The AFLC signal processing electronics may utilize the existing CT 301 or a separate CT for measuring the mains load current waveform. A first group of additional electronics tuned to the AFLC frequency is added to the PFC controller 302 to detect the AFLC carrier or "ripple" signal in addition to the measurement of the phase shift between the mains load voltage and current. A second group of additional electronics is added to the PFC controller 302 to drive the AFLC impedance switch 306. The AFLC impedance 305 connected in series with the PFC capacitors 304 is added.

In this embodiment, the AFLC impedance switch 306 is an electromechanical relay or contactor; and the AFLC impedance 305 is a simple resistor (R) that is of sufficient value to offer significant impedance in series with the PFC capacitors that allows the AFLC signal to bypass the PFC unit. When an AFLC signal is presented in the electrical power distribution network, the additional AFLC signal processing electronics detect the AFLC carrier or "ripple" signal and rapidly switch in the AFLC impedance 305, removing the PFC capacitors 304 for a period of time to allow the complete AFLC signal to pass. The AFLC signal processing by the PFC unit 300 in accordance to this embodiment presents a minimal interference to the mains voltage as opposed to the case of switching all or most of the PFC capacitors in and out of the circuit.

Various detection and timing means maybe used to allow the full AFLC signal to be completely transmitted to the AFLC relays. For example, maintaining the switch-in of the AFLC impedance 305 by a fixed period of time and ongoing detection once the presence of the AFLC signal is first detected. It is to be noted that the AFLC signal processing electronics must operate rapidly. In referring to FIG. 1B, the digital component of a standard AFLC signal has a start pulse of 600 milliseconds wide. An AFLC relay must receive a substantial portion of the 600 milliseconds start pulse in order to operate reliably.

Figure 3B:
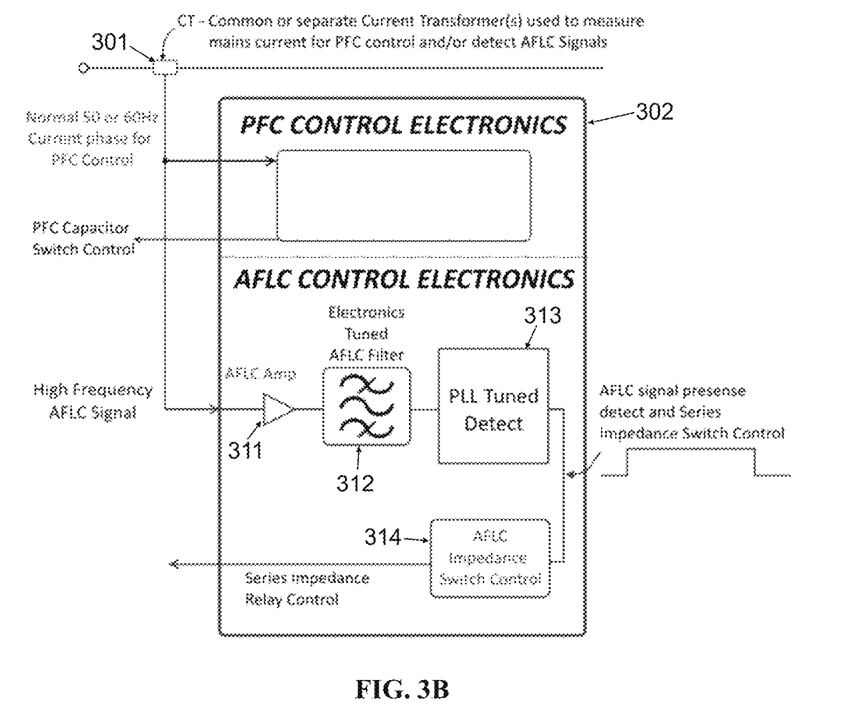
FIG. 3B depicts a simplified circuit diagram of the PFC controller with the addition of AFLC signal processing electronics of the PFC unit depicted in FIG. 3A.

FIG. 3B shows the PFC controller 302 in more details. The mains load current waveform at the output of the CT 301 is received in parallel by the PFC control electronics and the AFLC signal processing electronics in the PFC controller 302. The high frequency AFLC carrier or "ripple" signal component is first amplified by the amplifier 311. The amplified signal is passed to the tuned filter 312 that is tuned to the specific AFLC fixed carrier or "ripple" signal frequency used. The output of the tuned filter 312 is then passed to the tuned phase lock loop (PLL) 313 to suppress signal noise. The output of the PLL 313 indicates the presence (or absence) of an AFLC signal and is used by the AFLC impedance switch control electronics 314 to rapidly open the AFLC impedance switch 306 in the presence of an AFLC signal, as such introducing the AFLC impedance 305 connected in series with the PFC capacitors 304, blocking the AFLC signal from the PFC unit.

Once the AFLC signal passes, in the absence of an AFLC signal, the AFLC impedance switch control electronics 314 are to by default close the AFLC impedance switch 306, bypassing the AFLC impedance 305.

Figure 3C:
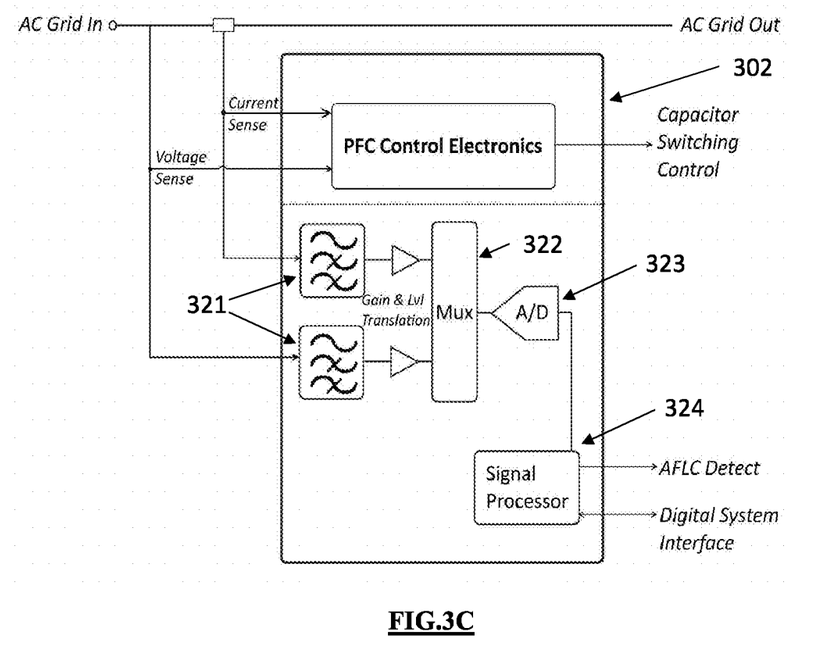
FIG. 3C shows a AFLC signal detection circuit in a PFC unit 300 with the AFLC signal processing electronics in accordance to another embodiment of the present invention.

FIG. 3C shows a AFLC signal detection circuit in a PFC unit 300 with the AFLC signal processing electronics in accordance to another embodiment of the present invention. In this embodiment, both analog grid voltage and grid current signals are respectively fed into the PFC control electronics and the AFLC signal processing electronics in the PFC controller 302. The voltage and current signals are filtered by two high pass filters 321. The purpose of these high pass filters is to attenuate the fundamental power line frequency components to improve the dynamic range of higher frequency AFLC signal before digitally processing. The high pass filters also provide DC level shift and gain setting such that the maximum possible signal amplitude is within the analog dynamic range capability of the AFLC signal detection circuit. The filtered voltage and current signals are then selected by a multiplexer 322. The selected voltage and current signals are converted to digital quantity by an analog to digital (A/D) converter 323. The time varying voltage and current waveforms are processed by a digital signal processor 324 in a periodic manner, wherein the voltage and current waveforms are sampled and transformed into frequency domain to identify specific frequency components of the AFLC signals. In practical applications, the multiplexer, A/D converter and signal processor can be functional blocks integrated in a micro-processor.

Although only single phase electrical systems are described herein, the principles of the present invention can be applied to other AC frequency and poly-phase AC systems, for example, common 3-phase electrical systems.

Figure 4:
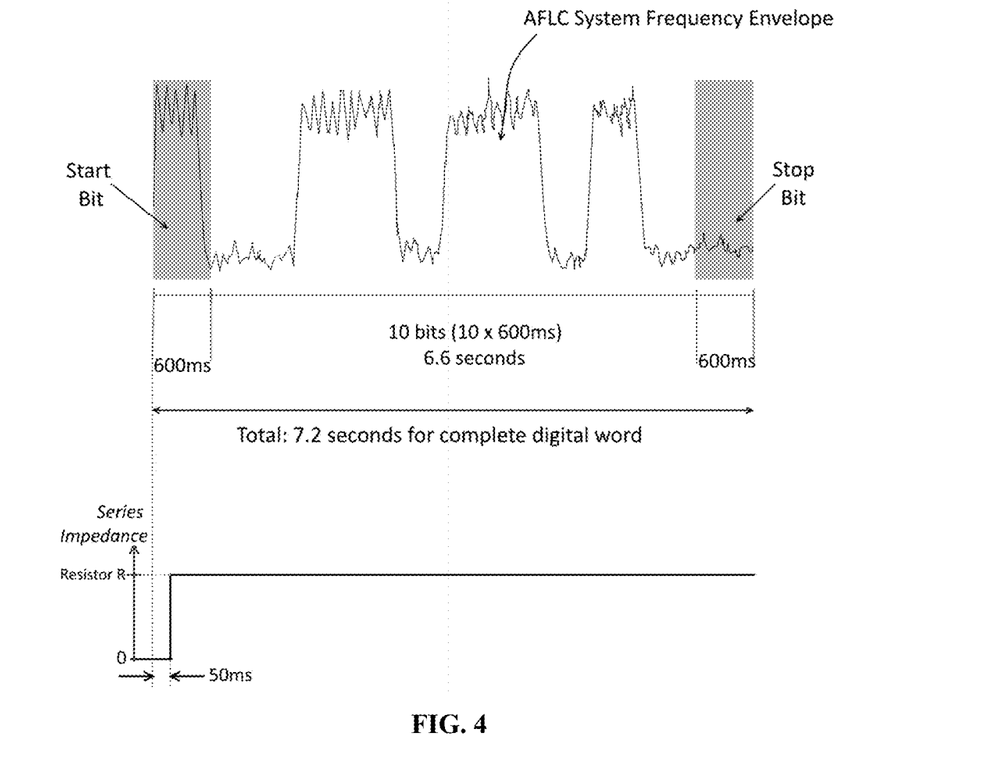
FIG. 4 shows details of the digital encoding of a legacy Decabit AFLC carrier or "ripple" signal encoded with a standard Decabit digital word along with the timing details of the introduction of the AFLC impedance in accordance to an embodiment of the present invention.

FIG. 4 shows the details of the digital encoding of a legacy Decabit AFLC carrier or "ripple" signal encoded with a standard Decabit digital word along with the timing details of the AFLC impedance being introduced in the PFC controller in accordance to the above-described embodiment of the present invention. As can be seen, AFLC impedance, implemented as the resistor (R), can be switched in less than 50 milliseconds from the detection of the start pulse of the Decabit digital word. As such the full AFLC signal can bypass the PFC unit with nearly 92% of the first 600 milliseconds wide AFLC signal start pulse intact for the reliable operation of a normal AFLC relay.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. An apparatus for Audio Frequency Load Control (AFLC) in an electrical power distribution network installed with a power factor correction (PFC) unit, comprising:
    a first electronic circuitry for detecting one or more AFLC carrier signals in the electrical power distribution network mains load current and/or voltage waveform at an input of the first electronic circuitry;
    a second electronic circuitry for receiving an output of the first electronic circuitry indicating a presence or absence of AFLC signal and driving a AFLC impedance switch;
    the AFLC impedance switch connected in parallel with an AFLC impedance;
    the AFLC impedance connected in series with one or more PFC capacitors in the PFC unit, wherein the AFLC impedance being sufficiently large to allow an AFLC signal to bypass the PFC unit when switched in;
    wherein the AFLC impedance switch being opened during the presence of AFLC signal, as such switching in the AFLC impedance.

2. The apparatus of claim 1, wherein the first electronic circuitry comprising:
    an amplifier for amplifying the AFLC carrier signal;
    a tuned filter for filtering the amplified AFLC carrier signal and being tuned to the AFLC carrier signal frequency; and
    a phase lock loop for suppressing signal noise in the filtered and amplified AFLC carrier signal and indicating the presence of AFLC carrier signal.

3. The apparatus of claim 1, further comprising a current transformer (CT) for measuring the electrical power distribution network mains load current waveform to be fed to the first electronic circuitry.

4. The apparatus of claim 1, wherein the AFLC impedance comprising a resistor.

5. The apparatus of claim 1, wherein the first electronic circuitry, the second electronic circuitry, and the AFLC impedance switch comprising fast response electronic components such that the AFLC impedance is switched in within 50 milliseconds from detection of a start pulse of an AFLC signal.

6. The apparatus of claim 1, wherein the first electronic circuitry further comprising:
    one or more filters for filtering the AFLC carrier signals and being tuned to the AFLC carrier signal frequency;

a multiplexer for selecting the filtered AFLC carrier signals;

an analog to digital converter for converting the selected AFLC carrier signal into digital signals; and a signal processor for sampling and transforming the digitized AFLC carrier signals into frequency domain to identify frequency components of the AFLC carrier signals.

\* \* \* \* \*